United States Patent [19]

Harrell

[11] Patent Number: 5,106,020

[45] Date of Patent: Apr. 21, 1992

[54] SPRAY ATTACHMENT FOR LAWN MOWERS

[76] Inventor: Sherwood L. Harrell, 1996 Kings Hwy., Suffolk, Va. 23435

[21] Appl. No.: 593,986

[22] Filed: Oct. 9, 1990

[51] Int. Cl.$^5$ .............................................. B05B 9/04
[52] U.S. Cl. ............................... 239/172; 239/532; 239/289
[58] Field of Search ............... 56/2, DIG. 9, 202; 239/162, 164, 172, 281, 289, 70, 532

[56] References Cited

U.S. PATENT DOCUMENTS

| | | | |
|---|---|---|---|
| 2,865,671 | 12/1958 | Jonson | 239/289 X |
| 3,322,397 | 5/1967 | Pierce | 239/289 X |
| 3,488,061 | 1/1970 | Hansen et al. | 239/172 X |
| 3,796,028 | 3/1974 | Federspiel | 56/DIG. 9 X |
| 3,857,515 | 12/1974 | Zennie | 239/289 X |
| 3,915,382 | 10/1975 | Davis | 239/281 X |
| 4,736,888 | 4/1988 | Fasnaght | 239/169 X |
| 4,817,870 | 4/1989 | Dalton | 239/172 X |
| 4,857,827 | 8/1989 | Fletcher et al. | 239/70 X |
| 4,865,255 | 9/1989 | Lavisotto | 239/172 X |
| 4,913,395 | 4/1990 | Setter | 239/177 X |

Primary Examiner—Andres Kashnikow
Assistant Examiner—Kevin P. Weldon
Attorney, Agent, or Firm—Robert W. Carlson

[57] ABSTRACT

The invention comprises of a spraying attachment for tractor type lawn mowers which is readily attached thereto and removed therefrom. The attachment includes a hitch which is connected to the hitch mechanism provided on tractor type mowers. The spraying mechanism includes a carriage, a reservoir for liquid to be sprayed, a nozzle or nozzles secured on the carriage, a hand manipulated sprayer and controls removably secured to the hood of the tractor.

2 Claims, 2 Drawing Sheets

SPRAY ATTACHMENT FOR LAWN MOWERS

BACKGROUND OF THE INVENTION

For many years, apparatus for spraying agricultural plants have been provided which are adapted to be connected to farm tractors and pulled over fields by the farm tractors. More recently, since the advent of the sit down tractor type lawn mowers, there have been attempts to provide attachments for such mowers which can be used for spraying lawns and bushes.

Most of the known devices have a number of disadvantages such as being cumbersome, expensive to manufacture and difficult to attach to the mower. Most of the attachments are supported on wheels and require alteration of the mower to secure the attachment thereto.

Many of the known devices are quite heavy and cannot be easily and quickly dissembled thereby requiring substantial storage space when not in use as well as being easily transported.

Baran, Jr. U.S. Pat. No. 4,725,004 discloses a spraying attachment for a mower which is supported in a cantilever fashion to the rear of the mower. The structure of the assembly appears to be quite cumbersome which would be costly to manufacture, heavy to manipulate and quite time consuming to attach to a mower and to prepare for use.

It is an object of this invention to overcome the many disadvantages of the existing mower spraying attachments.

It is another object of the invention to provide a mower spraying attachment which is light weight and is easily secured to a mower without alteration of the mower.

It is still another object of the invention to provide a mower spraying attachment which is inexpensive to manufacture by incorporating some hardware available on the market today.

It is also an object of the invention to provide a mower spraying attachment which is readily dissembled for storage or transport.

These and other advantages will become readily apparent from the following description and the accompanying drawings in which:

FIG. 1 is a perspective view of the spraying attachment secured to the rear of a mower, FIG. 2 is a perspective view of the carriage of the spraying attachment secured to the rear of a mower, FIG. 3 is a perspective view of the spraying attachment in its disassembled condition; and FIG. 4 is a perspective view of a mower with the spraying attachment secured thereto and an operator using the hand wand.

DETAILED DESCRIPTION OF THE INVENTION

Figure 1:
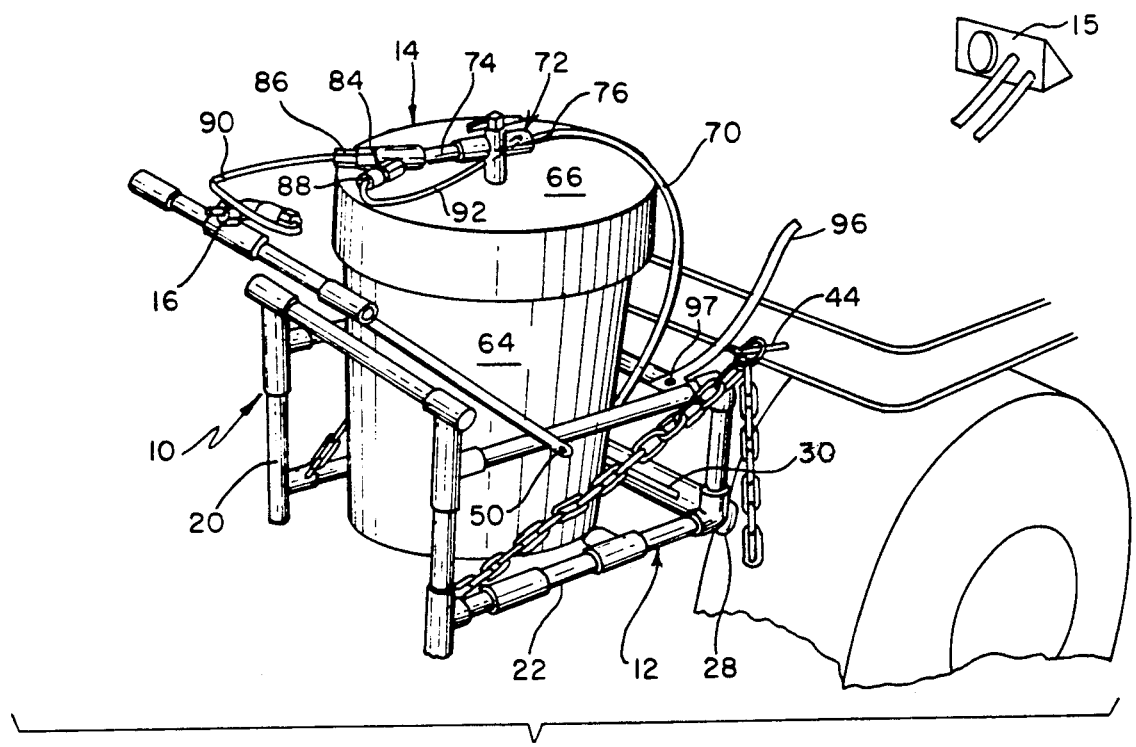
Figure 2:
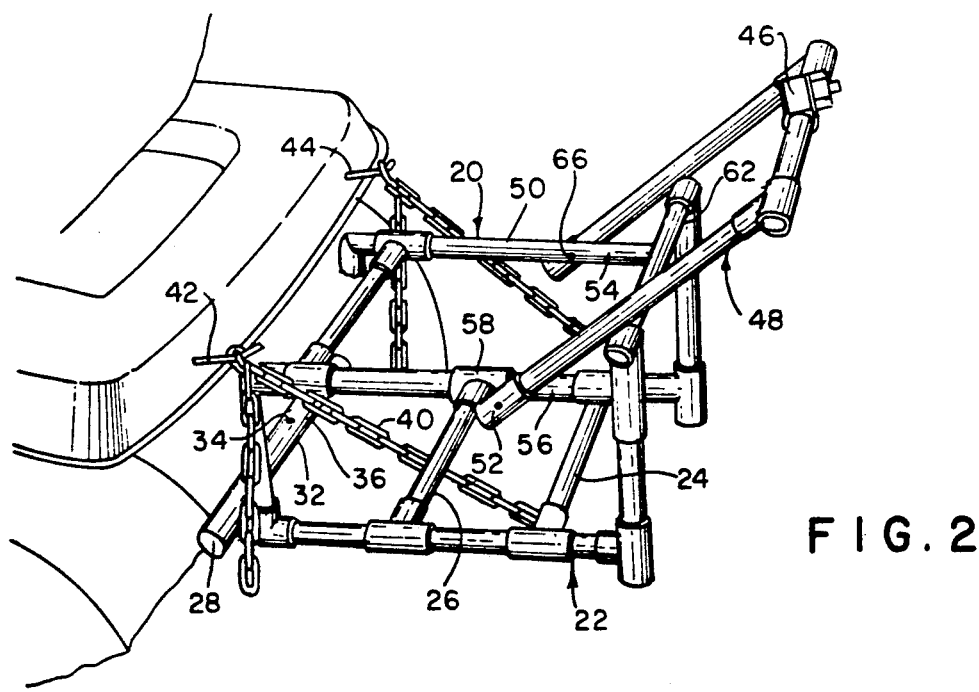
Figure 3:
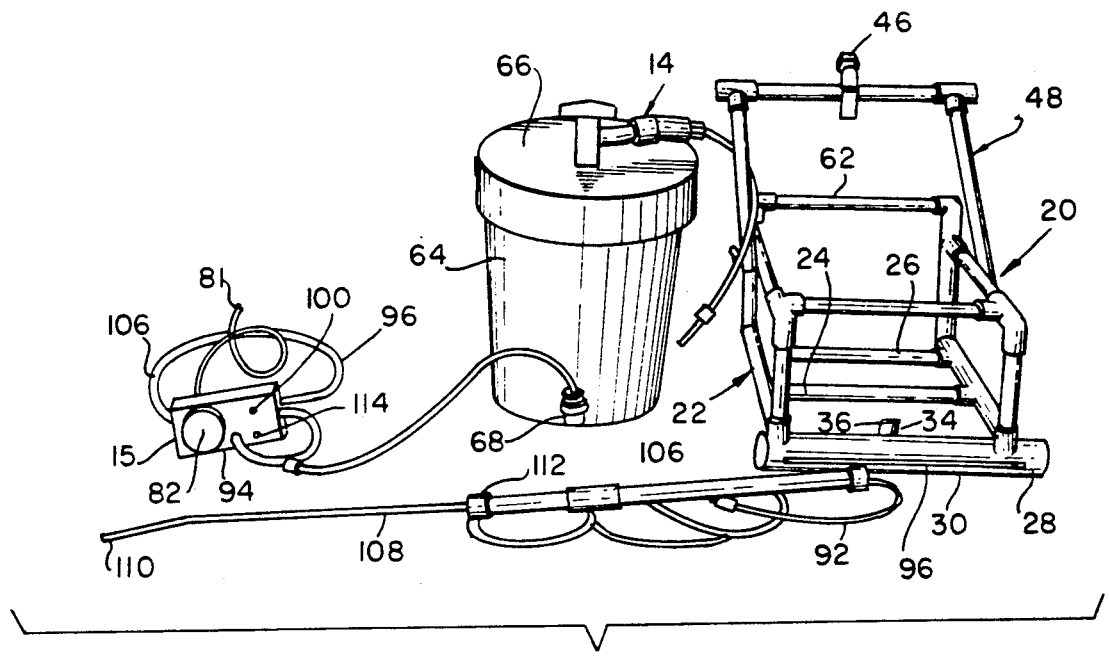
Figure 4:
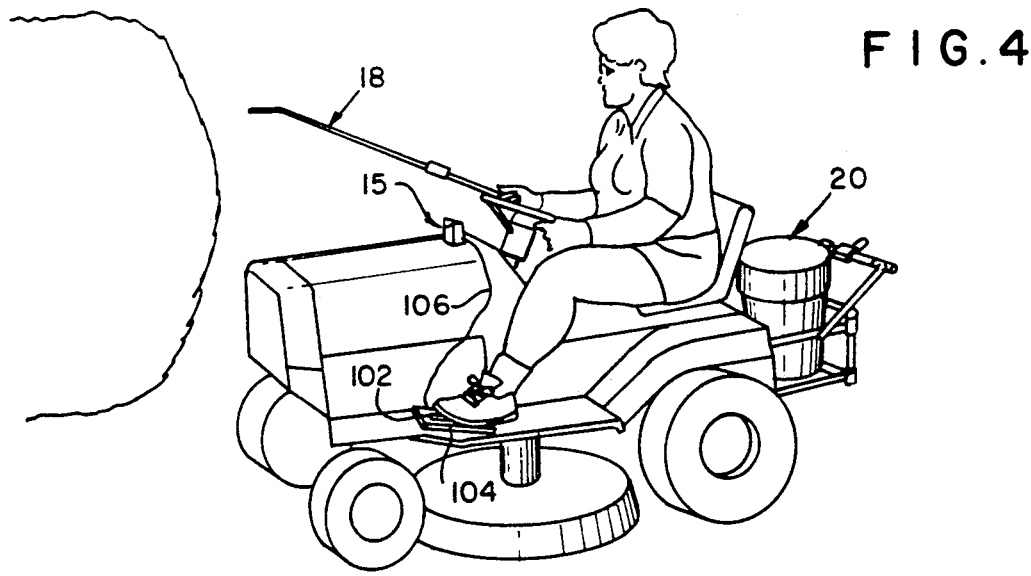

The sprayer attachment 10 comprises of a carriage 12, a reservoir 14, a control box 15, fixed nozzle means 16 and a hand manipulative spray wand 18.

The carriage 12 is formed of a plurality of plastic tubular members secured together to form an open framework for supporting the reservoir 14 including a pair of rectangular sidewalls 20 and 22.

A pair of tubes 24 and 26 extend horizontally between the bottoms of the sidewalls 20 and 22 and are secured rigidly thereto for supporting the reservoir 14.

A further tube 28 extends between the sidewalls 20 and 22 parallel to the tues 24 and 26 and is adapted to cooperate with the conventional hitch provided on the mower for connecting the carriage 12 to a mower.

In the preferred embodiment, the tube 28 has slots 30 extending horizontally in diametrically opposed walls thereof. The slots 30 receive the conventional hitch plate 32 which is provided on most mowers and a pin 34 is inserted through a pair of holes 36 in the tube 28 and a hole 38 in the hitch plate 32.

In the event the mower is provided with a ball hitch, the tube 28 may have a socket secured thereto.

A pair of chains 40 extend from the remote button corners of the sidewalls 20 and 22 to the rear of the mower for supporting the carriage 12 in cantilever fashion from the end of the mower. In this manner, there is no need for wheels on the carriage 12.

A pair of conventional C-clamps 42 and 44 are utilized to secure the chains 40 to the rear of the mower at positions spaced above the hitch plate 32.

A nozzle 46 is mounted on a U-shaped member 48 which is adjustably supported on the sidewalls 20 and 22. The free ends of the U-shaped member 48 are secured to the sidewalls 20 and 22 by means of bolts 50 and 52 extending through slots 54 and 56 formed in the upper tubes of the sidewalls. The free ends of the U-shaped member 48 can be slidably moved toward or away from the rear of the mower and wing nuts 58 and 60 can be tightened to secure the U-shaped member in a selected position. The legs of the U-shaped member rest freely on cross tube 62 which extends between the sidewalls 20 and 22. With this arrangement, the height of nozzle 46, relative to the ground, may be adjusted easily. If desired, a plurality of nozzles may be provided.

The reservoir 14 consists of a commercially available plastic or metal container 64 having an airtight lid 66. Near the bottom of the container a conventional liquid pump 68 is installed having a flexible conduit 70 extending to a manifold 72 mounted on the lid 66. The manifold 72 may be T-shaped with outlets 74 and 75 extending therefrom with a further outlet 78 extending into the exterior of the container 64. A pressure regulator valve 73 is mounted on the manifold 72 which is manually operated to select the pressure of the liquid delivered to the nozzles.

The manifold 72 is provided with a two-way valve 80. The valve 80 is a two way valve which in one position directs liquid from the manifold 72 to the outlets 74 and 76. In the other position, the valve 80 directs liquid into the reservoir 14 to agitate the liquid therein, if so desired.

The outlet 74 is connected by a flexible conduit 81 to a pressure gauge 82 mounted in control box 15.

The outlet 76 is connected to a flow divider 84 having shut off valves located in each of its outlets 86 and 88. The outlet 86 is connected to the nozzle by a flexible conduit 90.

The outlet 88 is connected to the wand 18 by a flexible conduit 92. This enables the liquid to be selectively directed to either the fixed nozzle 46 or the wand 18.

The control box 15 includes a magnet 94 in the bottom wall for removably mounting the box 15 on the hood of a tractor. A wiring harness 96 extends from the control box 15 to the electric pump 68 mounted on the bottom of the container 64. Substantially midway of the length of the wiring harness 96 are a pair of suitable clips 97 for connecting the wiring harness 96 to the battery of the mower.

A single pole double throw center off switch 100 is mounted in the control box 15 for selectively activating the sprayer for continuous operation or for activating a remote control switch 102. The remote control switch 102 is a conventional push button switch which is mounted on a plate 104 supported on the footrest of the mower and is connected to the control box 15 by wiring 106.

The remote control enables the operator to accomplish precision and spot spraying in a most convenient manner.

The wand 18 comprises of a pair of tubular members 108 and 106. The member 108 is provided with a nozzle 110 and is telescopically received in the member 106. The member 106 is connected to the manifold 72 by the conduit 92. The wand 18 may thus be readily adjusted in length for spraying bushes, plants, and to reach places which are inaccessible to the fixed nozzle. A magnet 112 is secured on the wand 18. When the wand is not in use, it may be placed on the mower in a position which is easily reached by the operator.

A light 114 is provided on the control box 15 to indicate when the spraying is activated.

It will now be apparent that the various elements of the spraying apparatus may be quickly assembled and without requiring special tools.

The spraying attachment is light weight and easily positioned to be hitched to the mower.

The control box 15 positioned on the hood of the tractor enables the operator to be aware of the condition of the spraying system as well as enables the operator to select desired conditions.

I claim:

1. A spray attachment for tractor type lawn mowers having a conventional engine and electrical system comprising a carriage having means for connecting the carriage to the hitch means of a mower, a reservoir removably supported on the carriage, an electric pump mounted on the reservoir and connected to a manifold secured to the reservoir, an adjustable nozzle support mounted on said carriage and having nozzle means secured thereto, a conduit connecting said nozzle means to said manifold, a control box having a magnet for removably securing said control box to the hood of a mower, and a wiring system connecting said control box with the electric system of the mower and with the pump.

2. A spray attachment for tractor type lawn mowers having a conventional engine and electrical system comprising a carriage having hitch means for connecting the carriage to the hitch means of a mower, a reservoir removably supported on the carriage, an electric pump mounted on the reservoir and connected to a manifold secured to the reservoir, an adjustable nozzle support mounted on said carriage and having nozzle means secured thereto, a conduit connecting said nozzle means to said manifold, a control box adapted to be removably secured on the hood of a mower, a wiring system connecting said control box with the electric system of the mower and with the pump, a hand manipulative spray connected to said reservoir and having a magnet secured thereto so that said hand manipulative means may be attached to a mower when not in use.

* * * * *